(12) United States Patent
Inoue

(10) Patent No.: US 8,925,355 B2
(45) Date of Patent: Jan. 6, 2015

(54) OPTICAL FIBER AND METHOD OF MANUFACTURING OPTICAL FIBER PREFORM

(75) Inventor: Dai Inoue, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 337 days.

(21) Appl. No.: 13/357,620

(22) Filed: Jan. 25, 2012

(65) Prior Publication Data

US 2012/0186303 A1    Jul. 26, 2012

(30) Foreign Application Priority Data

Jan. 26, 2011   (JP) .................. 2011-013788

(51) Int. Cl.
C03B 37/012     (2006.01)
C03B 37/014     (2006.01)

(52) U.S. Cl.
CPC ..... *C03B 37/01228* (2013.01); *C03B 37/01466* (2013.01)
USPC .................. 65/412; 65/428; 65/429

(58) Field of Classification Search
CPC .................. C03B 31/1228; C03B 37/01466
USPC .................. 65/412, 428, 429
See application file for complete search history.

(56) References Cited

U.S. PATENT DOCUMENTS

2006/0223427 A1* 10/2006 Tsumuraya et al. ............ 451/61
2009/0208760 A1*  8/2009 Kuwahara et al. ............ 428/428
2009/0272716 A1* 11/2009 Bookbinder et al. ............ 216/24

FOREIGN PATENT DOCUMENTS

| | | |
|---|---|---|
| CN | 1802324 A | 7/2006 |
| DE | 10325539 A1 | 1/2004 |
| DE | 102009022686 A1 | 12/2010 |
| EP | 1529759 A1 | 5/2005 |
| JP | S61-191864 U | 11/1986 |
| JP | H10-10369 A | 1/1998 |
| JP | H10-315126 A | 12/1998 |
| JP | H11-156704 A | 6/1999 |
| JP | 2000-239033 A | 9/2000 |
| JP | 2003-089550 A | 3/2003 |

OTHER PUBLICATIONS

Machine translation of JP 2000-239033, Sugama et al., Quartz Glass Cylinder Body and Apparatus for Polishing Inner Surface Thereof, Sep. 5, 2000.*
"Notice of Reasons for Refusal" issued by the Japan Patent Office for application No. 2011-013788.
First Office Action for Application No. 201210019185.1, issued by the State Intellectual Property Office of Peoples' Republic of China on Jan. 6, 2014.
Extended European Search Report issued for counterpart European Application 12152376.5.

* cited by examiner

*Primary Examiner* — Queenie Dehghan

(57) ABSTRACT

A method for manufacturing an optical fiber preform that includes preparing a glass cylinder with inner and outer surfaces forming at least part of a cladding portion are repeatedly polished, and a glass core rod that includes a core portion having a higher refractive index than the cladding portion; and inserting the core rod into the glass cylinder and heating the glass cylinder and core rod to form a single body. The repeated polishing of the inner surface of the glass cylinder includes passing pure water that does not contain a cutting fluid over the inner surface for at least the final polishing. The polishing is preferably performed using a polishing cloth to which are affixed diamond abrasive grains. The glass core rod and the glass cylinder are preferably formed of composite quartz glass.

6 Claims, No Drawings

OPTICAL FIBER AND METHOD OF MANUFACTURING OPTICAL FIBER PREFORM

The contents of the following Japanese patent application are incorporated herein by reference: No. 2011-013788 filed on Jan. 26, 2011

BACKGROUND

1. Technical Field

The present invention relates to a quartz glass optical communication fiber (referred to hereinafter as an "optical fiber") and to a method of manufacturing an optical fiber preform thereof.

2. Related Art

Generally, an optical fiber includes a core portion that transmits light and a cladding portion that surrounds the core portion. The core portion generally has a higher refractive index than the cladding portion. The optical fiber is obtained by heating and softening an optical fiber base material in an electric furnace and then drawing the optical fiber base material to have the desired thickness. The optical fiber base material is manufactured by forming a core rod including the core portion and, in some cases, part of the cladding portion, and then applying another cladding portion on the outside of the core rod. To form the core portion, VAD (vapor-phase axial deposition), OVD (outside vapor deposition) MCVD (modified chemical vapor deposition), or PCVD (plasma chemical vapor deposition) is used. The cladding portion applied to the outside of the core rod may be directly deposited on the core rod using OVD and then vitrified to form a transparent glass in a heating furnace, or may be formed by covering the core rod with an independently formed cylinder.

The method of covering the core rod with the cylinder is referred to as RIT (rod in tube) or RIC (rod in cylinder). Here, the structure resulting from the manufactured cylinder being drawn to have the desired thickness is referred to as a "tube," and the manufactured cylinder itself is referred to as the "cylinder." In other words, the size of the cylinder is greater in the RIC method than in the RIT method, but both methods are the same from a technical view point, and the distinction therebetween is vague. Accordingly, the method of providing the cladding portion by covering the core rod with a cylinder is referred to generally hereinafter as the RIT method.

With the RIT method, the core rod is inserted into the cylinder and heated to be integrated as a single body, and the drawing to the desired thickness may be performed simultaneously while forming the cylinder and the core rod as a single body, or the cylinder and the core rod may be integrated as a single body without simultaneous drawing. Obviously, performing the integration without drawing is simpler. On the other hand, although performing the drawing simultaneously with the integration is more complicated, this method has the benefit that the preform can be manufactured to have a size corresponding to the draw furnace into which the preform will later be inserted. In this case, the original cylinder and core rod can be larger without being limited by the size of the draw furnace, thereby achieving a higher productivity rate than the method of only performing the integration. It should be noted that the drawing to form the optical fiber can also be performed at the same time as the integration.

Here, OVD is used to manufacture the composite quartz cylinder. The following is an example of this manufacturing method. An aluminum core rod is used as a substrate, a silicon compound such as silicon tetrachloride is used as the raw material, and silicon dioxide fine particles formed by hydrolyzing the silicon compound in an oxygen flame are deposited on the substrate to form a soot deposition body. After the deposition is finished, the aluminum core rod is removed, a carbon core rod is inserted, the resulting structure is dehydrated in a chlorine atmosphere, and the structure is then vitrified in a heating furnace to form clear glass. The dehydration and vitrification may be performed in series in the same furnace, or may be performed in different furnaces. When vitrification is performed with a constant normal pressure, it is preferable to use an atmosphere containing a gas with low molecular weight, such as helium, because this will reduce the air bubbles remaining in the glass. If a gas with high molecular weight, such as nitrogen, is used, the heating and vitrification are preferably performed under reduced pressure, because this will reduce the air bubbles remaining in the glass.

Next, the carbon core rod is removed to obtain the quartz glass cylinder, and in this state, the inner and outer surfaces of the cylinder are both rough. The inner and outer surfaces are ground and polished, so that the inner diameter and outer diameter of the cylinder are uniform. The grinding is a process for eliminating large amounts of unevenness, and the polishing is a process performed after the grinding to remove the remaining small amounts of unevenness. After sufficient polishing, the surfaces become mirrors. The polishing is usually achieved by using a polishing cloth to rub a surface while passing a liquid including pure water and cutting fluid over the surface to increase the polishing efficiency. The polishing cloth may have diamond abrasive grains provided thereon, for example.

The quartz glass cylinder obtained in the manner described above is integrated with the core rod using the RIT method to form the preform, which is then drawn to form the optical fiber. Transmission loss is one important characteristic of the optical fiber. Generally, in a single mode optical fiber, the core portion is doped with Ge and the refractive index thereof is approximately 0.35% higher than that of the cladding portion, which is often made of pure quartz. In such an optical fiber, the minimum transmission loss occurs near 1550 nm, and is in a range approximately from 0.180 to 0.190 dB/km. The transmission loss at 1550 nm and at longer wavelength regions changes at the interface between the core rod and the cladding portion applied later.

If there are impurities near the interface, the transmission loss in longer wavelength regions increases. This can be thought of as being caused by absorption loss due to the impurities or microbending loss due to small diameter changes in the core caused by the impurities. In order to avoid this problem, the preform is manufactured using the RIT technique after washing the inner surface of the cylinder with an HF solution and pure water. Washing with the HF solution removes a portion of the glass along with impurities on the surface, as a result of the etching function, and this roughens the surface that is washed. The surface roughened in this way causes an increase in the number of air bubbles at the interface during manufacturing of the preform using the RIT technique, and is therefore undesirable.

SUMMARY

It is an object of the present invention to provide an optical fiber and a manufacturing method for an optical fiber preform in which impurities near an interface between the core rod and the cladding portion applied later are decreased, and the increase in transmission loss in a long wavelength region is restricted.

As a result of repeated in-depth investigations, it was found that the impurities remaining in the inner surface of the cylinder and causing an increase in the transmission loss are due to the cutting fluid used for the polishing. After polishing, the cylinder is sufficiently washed with pure water, but some components in the cutting fluid have a high affinity with glass and therefore cannot be removed simply by washing with pure water. When washing with the HF solution, the impurities are dissolved and removed along with a surface layer of glass, and the increase in transmission loss is restricted. The possibility of polishing without the cutting fluid was investigated, but this resulted in a decrease in the polishing efficiency and an increase in the number of times that polishing must be performed, thereby increasing the total time needed for the polishing. Therefore, polishing with pure water that does not contain the cutting fluid was performed for at least the final polishing of the repeated polishings. As a result, the total polishing time was not significantly increased and the impurities were able to be removed from the inner surface of the glass cylinder. By using the RIT method without washing the glass cylinder with the HF solution during at least the final polishing, an optical fiber preform was manufactured has low transmission loss, due to restricting the increase in the number of air bubbles.

The method for manufacturing an optical fiber preform according to the present invention includes preparing a glass cylinder with inner and outer surfaces forming at least part of a cladding portion are repeatedly polished, and a glass core rod that includes a core portion having a higher refractive index than the cladding portion; and inserting the core rod into the glass cylinder and heating the glass cylinder and core rod to form a single body. The repeated polishing of the inner surface of the glass cylinder includes passing pure water that does not contain a cutting fluid over the inner surface for at least the final polishing. The polishing is preferably performed using a polishing cloth to which are affixed diamond abrasive grains. The cutting fluid may refer to a component other than water, such as cutting oil. It should be noted that the cutting fluid refers to a component that is intentionally mixed with pure water, and doe not refer to components that are unintentionally mixed with the pure water used for the polishing.

The repeated polishing of the inner surface of the glass cylinder preferably includes polishing the inner surface of the glass cylinder while passing water containing the cutting fluid over the inner surface, before the final polishing. During the repeated polishing of the inner surface of the glass cylinder, the number of times polishing is performed while water containing the cutting fluid is passed over the inner surface is preferably greater than the number of times polishing is performed while passing pure water that does not contain the cutting fluid over the inner surface. The glass core rod and the glass cylinder are preferably formed of composite quartz glass. The glass cylinder according to the present invention is formed using the method for manufacturing an optical fiber preform described above, wherein, when repeatedly polishing the inner surface, at least the final polishing is performed while passing pure water that does not contain the cutting fluid over the inner surface.

The summary clause does not necessarily describe all necessary features of the embodiments of the present invention. The present invention may also be a sub-combination of the features described above.

DESCRIPTION OF EXEMPLARY EMBODIMENTS

Hereinafter, an embodiment of the present invention will be described. The embodiment does not limit the invention according to the claims, and all the combinations of the features described in the embodiment are not necessarily essential to means provided by aspects of the invention.

A core rod including a core portion and a cladding portion was manufactured using VAD. The manufactured core rod was drawn to have a diameter of 64 mm using a glass lathe with an oxygen flame. In the present embodiment, the core portion of the core rod is rectangular and has a refractive index that is approximately 0.35% greater than that of the cladding, but the present invention is not limited to this. As another example, a quartz glass cylinder may be manufactured using OVD. With OVD, an aluminum core rod was used as a base material, silicon tetrachloride was supplied in an oxygen flame, and the generated silicon dioxide fine particles were deposited on the base material to form a soot deposition body. Next, the aluminum core rod was removed from the soot deposition body, a carbon core rod was inserted in place of the aluminum core rod. The resulting structure was set in a chlorination furnace, and was then heated and dehydrated in an environment that is a mixture of chlorine and nitrogen.

Furthermore, the dehydrated soot deposition body was then set in a vitrification furnace and heated under low pressure to form a transparent glass body. The carbon core rod was removed from the glass body to obtain a quartz glass cylinder. The inner and outer surfaces of this cylinder were extremely rough, and therefore outer surface grinding, inner surface grinding, and outer surface polishing were performed in the stated order. As a result of the processing described above, a quartz glass cylinder was obtained in which the outer surface is a mirror and the inner surface is ground glass. The diameter of this quartz glass cylinder was approximately 197 mm and the inner diameter was approximately 67 mm.

EMBODIMENTS

First Embodiment

A dummy ring for handling was fused to the quartz cylinder described above, and the inner surface was then polished. The polishing was performed while a mixture of pure water and a conventionally used cutting fluid were passed over the quartz cylinder, and stroking was performed while rotating a rod having a tip around which was wrapped a polishing cloth having diamond abrasive grains thereon. This procedure was repeated five times, and on the sixth time, the polishing was performed using only pure water, without the cutting fluid being mixed therein. The structure resulting from a handling rod being connected to the core rod drawn to a diameter of 64 mm was inserted into the quartz cylinder obtained in the above manner. Nitrogen was passed from above through the gaps between the core rod and the quartz cylinder in order to maintain cleanliness. Next, the quartz cylinder was set in a draw furnace such that the bottom end thereof was positioned in the furnace, and the furnace was heated to reach a temperature greater than or equal to the softening point of quartz glass. After this temperature was maintained for a certain time, the tips of the quartz cylinder and the core rod softened and began to drop. After dropping, the tips were repeatedly removed until a suitable diameter of approximately 10 mm was obtained, and the removed portions were disposed of. A silicon rubber stopper was inserted from below into the remaining narrowed tip, and at the same time, the flow of nitrogen from above was stopped and a low pressure pump line was used instead. As a result, the gaps between the quartz cylinder and the core rod were at a low pressure and collapsed at the softened portions in the furnace, such that the quartz cylinder and core rod became a single body.

Next, the single body including the quartz cylinder and the core rod was gradually drawn downward, and therefore the glass drawn from the bottom of the furnace gradually became thicker. Upon reaching a desired thickness, such as a diameter of 80 mm, the drawn cylindrical glass was sandwiched by a pair of rollers disposed independently below the furnace and drawn thereby at a prescribed speed. The downward drawing speed of the single body including the quartz cylinder and the core rod and the drawing speed of the cylindrical glass below the furnace were adjusted to have the same material balance, and therefore the cylindrical glass had a stable outer diameter. The obtained cylindrical glass was drawn by a separate drawing device to obtain an optical fiber with a diameter of 125 µm. The loss of this optical fiber was measured, and was found to be 0.185 dB/km at 1550 nm, which is a low amount of loss.

First Comparative Example

A quartz cylinder was polished using the same method described above, except that the cutting fluid was mixed with the pure water during the final stroke of the polishing. The core rod was inserted into the resulting quartz cylinder to form a single body, thereby forming cylindrical glass. This cylindrical glass was drawn to form an optical fiber, and the loss thereof was measured. As a result, the loss was determined to be 0.198 dB/km at 1550 nm, which is greater than the loss of the first embodiment.

As made clear from the above, the embodiment of the present invention can be used to realize an optical fiber having favorable loss characteristics and reduced impurities near an interface between the core rod and the cladding portion that is applied later, without performing the HF cleaning that is used in the conventional method.

What is claimed is:

1. A method comprising:
polishing, repeatedly, an inner surface and an outer surface of a glass cylinder, wherein the repeated polishing of the inner surface of the glass cylinder includes, before the final polishing, polishing the inner surface of the glass cylinder while passing water containing cutting fluid over the inner surface and, in at least the final polishing, rubbing the inner surface while passing water that does not contain a cutting fluid over the inner surface;
inserting a glass core rod into the glass cylinder; and
heating the glass cylinder and the core rod to form a single optical fiber preform body including a core portion and a cladding portion, the core portion having a higher refractive index than the cladding portion, wherein the glass cylinder substantially forms the cladding portion and the glass core rod substantially forms the core portion.

2. The method according to claim 1, wherein during the repeated polishing of the inner surface of the glass cylinder, the number of times polishing is performed while water containing cutting fluid is passed over the inner surface is greater than the number of times polishing is performed while passing water that does not contain cutting fluid over the inner surface.

3. The method according to claim 1, wherein the polishing is performed using a polishing cloth.

4. The method according to claim 3, wherein the polishing cloth has a plurality of diamond abrasive grains affixed thereto.

5. The method according to claim 1, wherein the glass core rod and the glass cylinder are formed of composite quartz glass.

6. The method according to claim 1, wherein the water that does not contain cutting fluid is pure water.

* * * * *